US005247695A

United States Patent [19]
Kashiyama et al.

[11] Patent Number: 5,247,695
[45] Date of Patent: Sep. 21, 1993

[54] VECTOR PROCESSOR WITH BYTE ACCESS OF MEMORY

[75] Inventors: Masamori Kashiyama; Tomoo Aoyama, both of Hadano, Japan

[73] Assignees: Hitachi, Ltd.; Hitachi Computer Engineering Co., Ltd., Tokyo, Japan

[21] Appl. No.: 545,360

[22] Filed: Jun. 27, 1990

[30] Foreign Application Priority Data

Jul. 10, 1989 [JP] Japan ................. 1-175468

[51] Int. Cl.⁵ .................. G06F 12/02; G06F 15/347
[52] U.S. Cl. ......................... 395/800; 364/DIG. 1; 364/232.21
[58] Field of Search ............ 364/200, 736, 252.6, 364/232.21; 395/400, 900

[56] References Cited

U.S. PATENT DOCUMENTS

| | | | |
|---|---|---|---|
| 4,435,765 | 3/1984 | Uchida et al. ............... | 395/550 |
| 4,490,786 | 12/1984 | Nakatani ..................... | 395/800 |
| 4,725,973 | 2/1988 | Matsuura et al. ........... | 364/736 |
| 4,745,477 | 5/1988 | Buchholz et al. ........... | 395/800 |
| 4,777,593 | 10/1988 | Yoshida ....................... | 395/800 |
| 4,779,192 | 10/1988 | Torii et al. ................. | 395/800 |
| 4,825,361 | 4/1989 | Omoda et al. ............... | 395/800 |
| 4,881,168 | 11/1989 | Inagami et al. ............. | 395/800 |

FOREIGN PATENT DOCUMENTS 60-186964  9/1985  Japan .

*Primary Examiner*—Dale M. Shaw
*Assistant Examiner*—Lance Leonard Barry
*Attorney, Agent, or Firm*—Fay, Sharpe, Beall, Fagan, Minnich & McKee

[57] ABSTRACT

A vector processor in which input/output of vector data to and from a vector register is effected by a load-/store pipeline from a main memory, includes a load pipe for reading data of a plural-byte width from the main memory in one access, a plurality of vector registers for storing data read by the load pipe, each having a plurality of entries of an 8-byte width, mark bit stacks provided one for each of the vector registers and each having at least the same number of entries as those of the vector register, the entries of each mark bit stack storing mark bits for indicating which one of the plural-byte data stored in the entries of the corresponding vector register is valid, and a shifter for sending the valid data to an operation unit in accordance with the mark stored in the mark bit stack.

5 Claims, 5 Drawing Sheets

VECTOR PROCESSOR WITH BYTE ACCESS OF MEMORY

BACKGROUND OF THE INVENTION

The present invention relates to a vector processor, and more particularly to a vector processor for effectively controlling memory access while avoiding a memory bank conflict by effecting byte-by-byte data transfer between a vector register and an operation unit.

When image processing or information processing pertaining to artificial intelligence is to be effected in a data processor, a byte-by-byte memory accessing function is usually required.

A vector processor, having a high data processing ability, may use a plurality of operation units in an overlapped fashion by a utilizing a chaining function. In the vector processor, the memory accessing is effected not by byte but by word or double words in order to attain a high data processing ability.

In a scientific and technical calculation, most processings are effected by word or double words. Further high speed processing is attained by a memory access control system.

On the other hand, in image processing, the processing is effected by byte and hence it is difficult to attain a high processing speed by the memory access control because of memory bank conflict.

Memory accessing means for the vector processor for accessing by byte in order to solve the above problem is disclosed in JP-A-60-186964.

It is very difficult to implement access to the memory by byte while avoiding an increase in the amount of hardware.

For example, the physical quantity of the hardware may be considerably small if data are stored in successive addresses even if the is of byte dimensions. However, in information processing pertaining to artificial intelligence, it is difficult to store the data in the successive addresses.

In the prior art vector processor in which the image processing is effected byte by byte, it is difficult to attain high speed processing because memory bank conflict occurs during the memory access control.

SUMMARY OF THE INVENTION

It is an object of the present invention to provide a vector processor which attains byte-by-byte memory access control an memory accessing of the vector processor without leading to the increase of physical a quantity of hardware.

In accordance with the present invention, the vector processor effects the accessing to the data arranged on a memory byte by byte, or in byte units, in two operations, that is, data transfer between the memory and a vector register and data transfer between the vector register and an operation unit.

The vector processor comprises a logical unit for designating an indirect address in the memory accessing and sending/receiving byte data on any vector register by using a mark bit in the data transfer between the vector register and the operation unit, to and from the operation unit, an address generation logical unit for generating a list of mark bits, a data stack logical unit for retaining the mark bit list, a control logic for controlling vector register read/write operation in response to the mark bit list read from the data stack, and a vector element compression logical unit.

DESCRIPTION OF THE PREFERRED EMBODIMENTS

Figure 1:
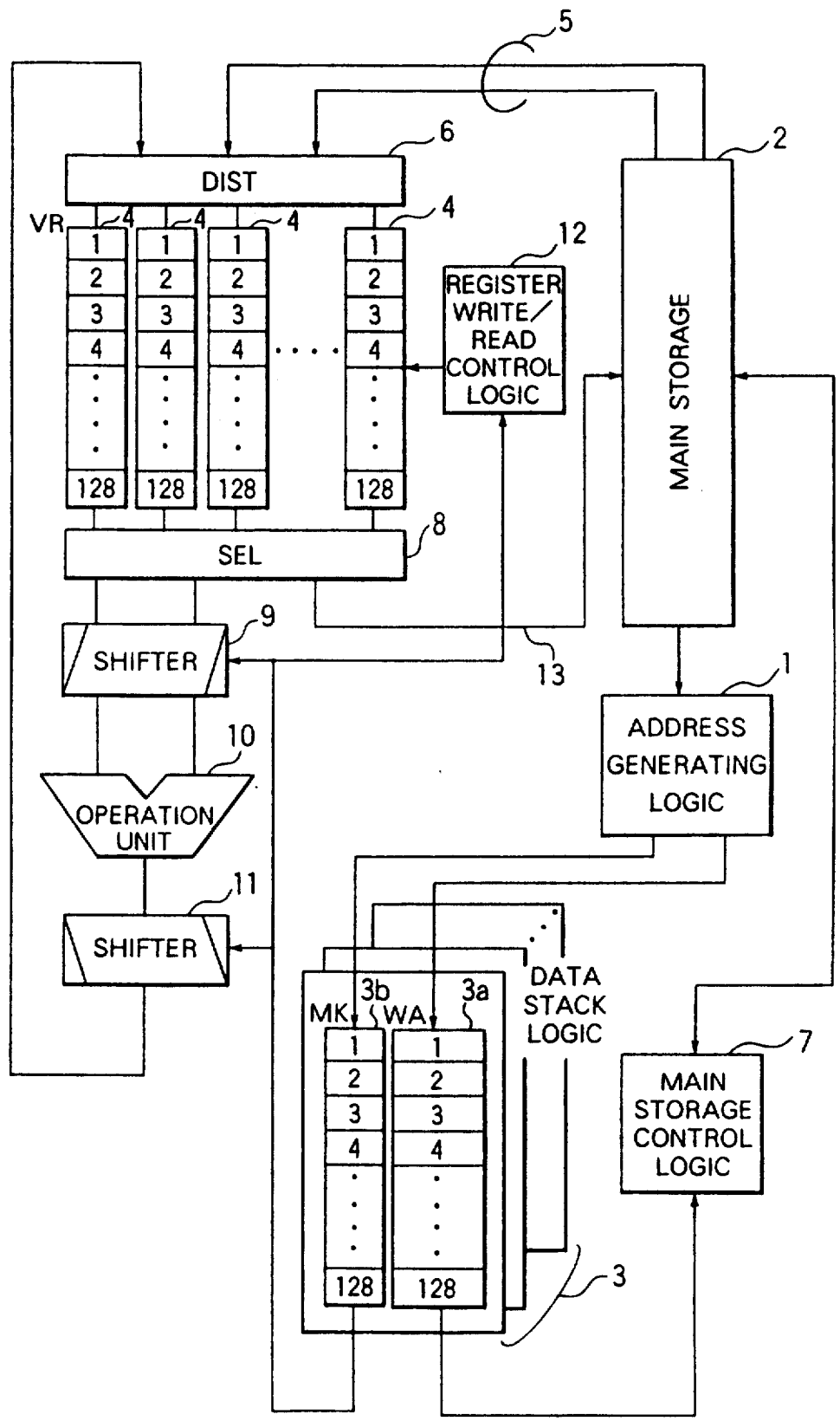
FIG. 1 shows a block diagram of a vector processor having a mark bit in accordance with the present invention.

One embodiment of a vector processor of the present invention is now explained in detail.

An outline of the present invention is first described.

An operation for a vector load/store instruction is defined by three elements, a base address (BR), increment data (ID) and a vector length (VL).

A memory access address of a vector element j is given by $$A(j) = BR + (j-1) * ID \qquad (1)$$

where $1 \leq j \leq VL$.

Where the memory is configured by word (=8 B), two quantities WA and MK are defined as follows.

$$WA(j) = [A(j)/8] \qquad (2)$$

$$MK(j) = Mod(A(j), 8) \qquad (3)$$

WA indicates a word address at which the vector element j is stored on the memory, and MK indicates a mark bit which designates a position at which the vector element j of data (word length) belonging to that word address are stored. The mark bits are counted like 0, 1, 2, . . . .

The WA and MK lists thus generated are stored in a data stack. The data stack may have a similar structure to that of the vector register.

Usually, a word consists of 4 B and a double-word consists of 8 B, but in the present specification, it is assumed that a word consists of 8 B.

In the vector load processing, the following processing is performed. The WA list is read from the data stack and indirect addressing to the memory is effected. The indirect addressing has been known. By the indirect addressing, the word data which includes the vector element on the memory are written into the vector register.

In the read mode of the vector register, the MK list is read from the data stack, the data read from the vector register are modified in accordance with the mark bit (to align a decimal point to that of the operation unit) and sent out to the operation unit. The data processed by the operation unit are written into the mark bit position of the original word-by-word data by the MK list.

In the vector store processing, one of two methods may be effected.

In the first method, the data on the memory are read out to the vector register in accordance with the WA list, and an operation result is written into the vector register in accordance with the MK list to prepare vector data in a pre-store stage.

In the second method, data are read out to the vector register from an area to be written into, and an output of the operation unit is written by the mark bit for the vector register to generate the vector data in the pre-store stage. In the second method, physical quantity of hardware may be reduced by improving the manner of use of the vector register by software.

The following description is based on the second method.

Where a plurality of vector elements are included at the same word address, the vector data in the pre-store stage must be edited on the vector. To this end, a vector element reducing logic is used. The data edited on the vector register can be accessed to any byte by the vector processor through the indirect addressing store accessing by the WA list.

By permitting the mark bit processing to the data on the vector register, the vector instruction has;

(1) operation code,
(2) operand register designation field,
(3) mask register designation field, as well as
(4) mark bit stack designation field, and
(5) WA address list stack designation field.

The vector load/store instruction is executed in a form of macro instruction which is realized by a plurality of operations.

FIG. 1 shows a block diagram of a vector processor having a mark bit stack in accordance with the present invention.

It is now assumed that vector data of byte units are vector-loaded in the vector processor, and is vector-stored after the vector operation.

In the load operation by the vector instruction, an address generation logical unit 1 generates a word address WA(j) which is a start address of 8 B in which an address A(j) of a target 1-byte (1 B) vector element j stored in a main memory 2 is included, and a mark bit MK(j) which indicates a byte position in the 8 B length designated by the word address. The word address WA(j), the mark bit MK(j) and the address A(j) of the vector element j are given by the formulas (1), (2) and (3).

The mark bit list (MK list) and the word address list (WA list) generated by the address generation logical unit 1 are stored in a data stack logical unit 3.

The target vector element is stored in a vector register (VR) 4 designated by the instruction through a pipeline 5 and a switch matrix logic DIST 6. The data stack logical unit 3 comprises a word address stack (WA) 3a for storing the word address stack (WA) 3a and a mark bit stack (MK) 3b for storing the mark bit MK(j), and it has 32 sets which is equal in number to the number of vector registers 4.

The numbers of the 32 vector registers 4 and the 32 data stack logical units 3 operate in a logically corresponding manner.

Figure 2:
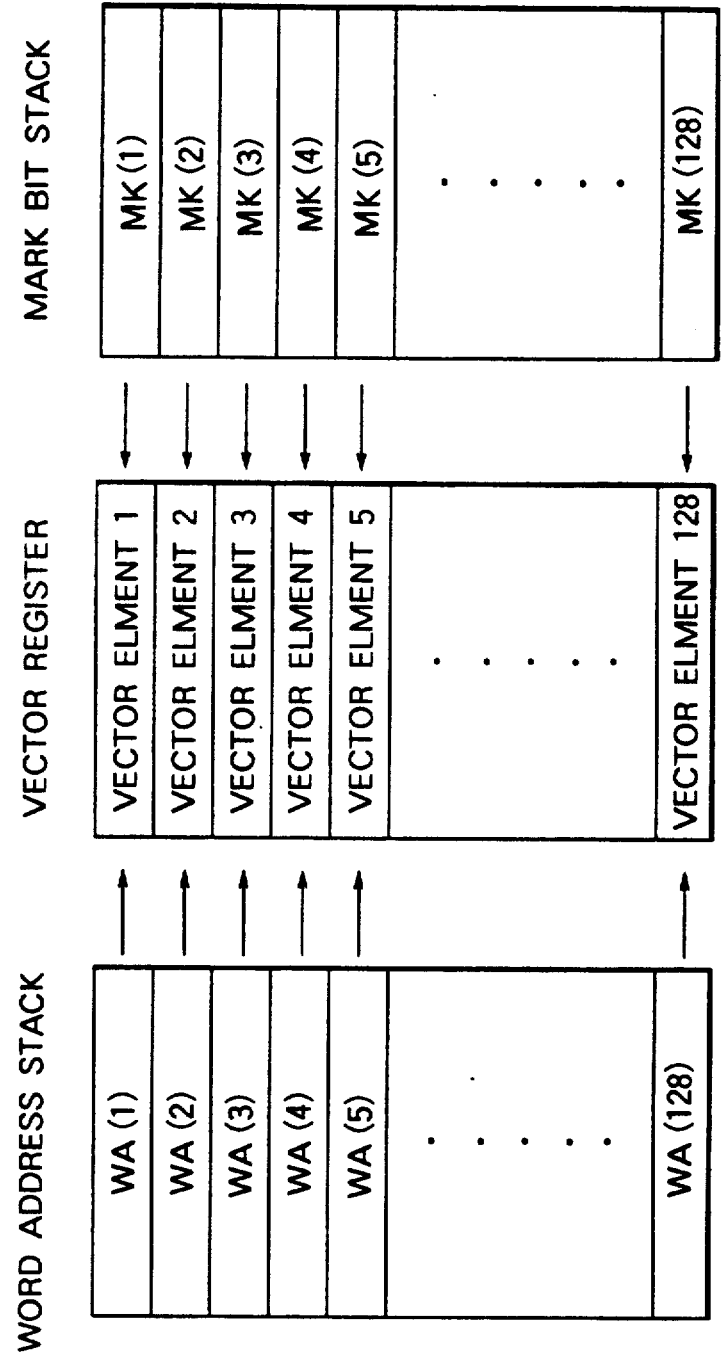
FIG. 2 illustrates a relationship between a vector register, and a mark bit stack and a word address stack.

As shown in FIG. 2, in the corresponding vector register 4 and word address stack 36, the vector element 1 corresponds to WA (1) and MK (1), and the vector element 2 corresponds to WA (2) and MK (2). They are in a similar relation among a maximum number 128 of elements which one vector register can hold.

In the vector loading, the word address WA (j) for the vector element j is outputted in accordance with the WA list stored in the word address stack 3a and it is supplied to a main memory access control logical unit 7 so that indirect addressing to the main memory 2 is effected.

Figure 3:
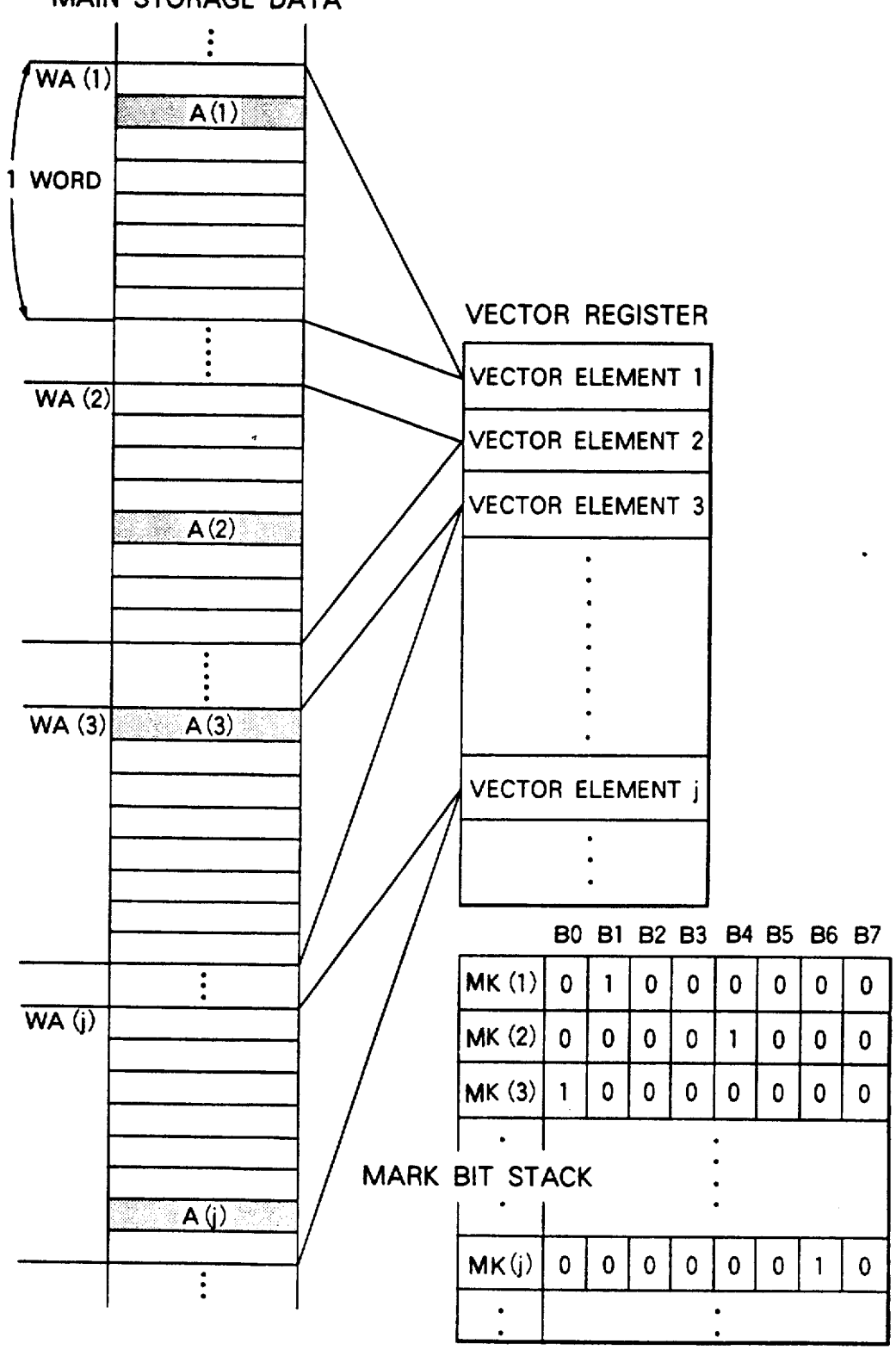
FIGS. 3 and 4 illustrate further details of the relationship of FIG. 2.

FIG. 3 shows a relation between the vector element j ($123 VL < j$, $8 \leq ID$) of byte unit stored in the main memory 2 and the mark bit stack 3b when the vector element j is loaded into the vector register 4.

The vector register 4 has an 8 B (one word) width and the load operation is performed word by word, or in word units. Accordingly, the data of the vector element 1 corresponding to the address A (l) is written into the vector register, 8 B at a time, starting from WA (l) which is a start address.

Similarly, the vector elements are written until the vector element A (j) is written. In the mark bit stack 3b, when the vector element 2 is written for example, it is a fourth byte and hence the B4 bit of the corresponding MK (2) is set to "1", and other bits are set to "0" (The bytes in the word are counted like bytes 0, 1, 2, ... 7.). Other vector elements are written in the same manner. The mark bit stack 3b comprises 8 bits B0, B1, B2, ... B7 to correspond to the bytes of one word.

Figure 4:
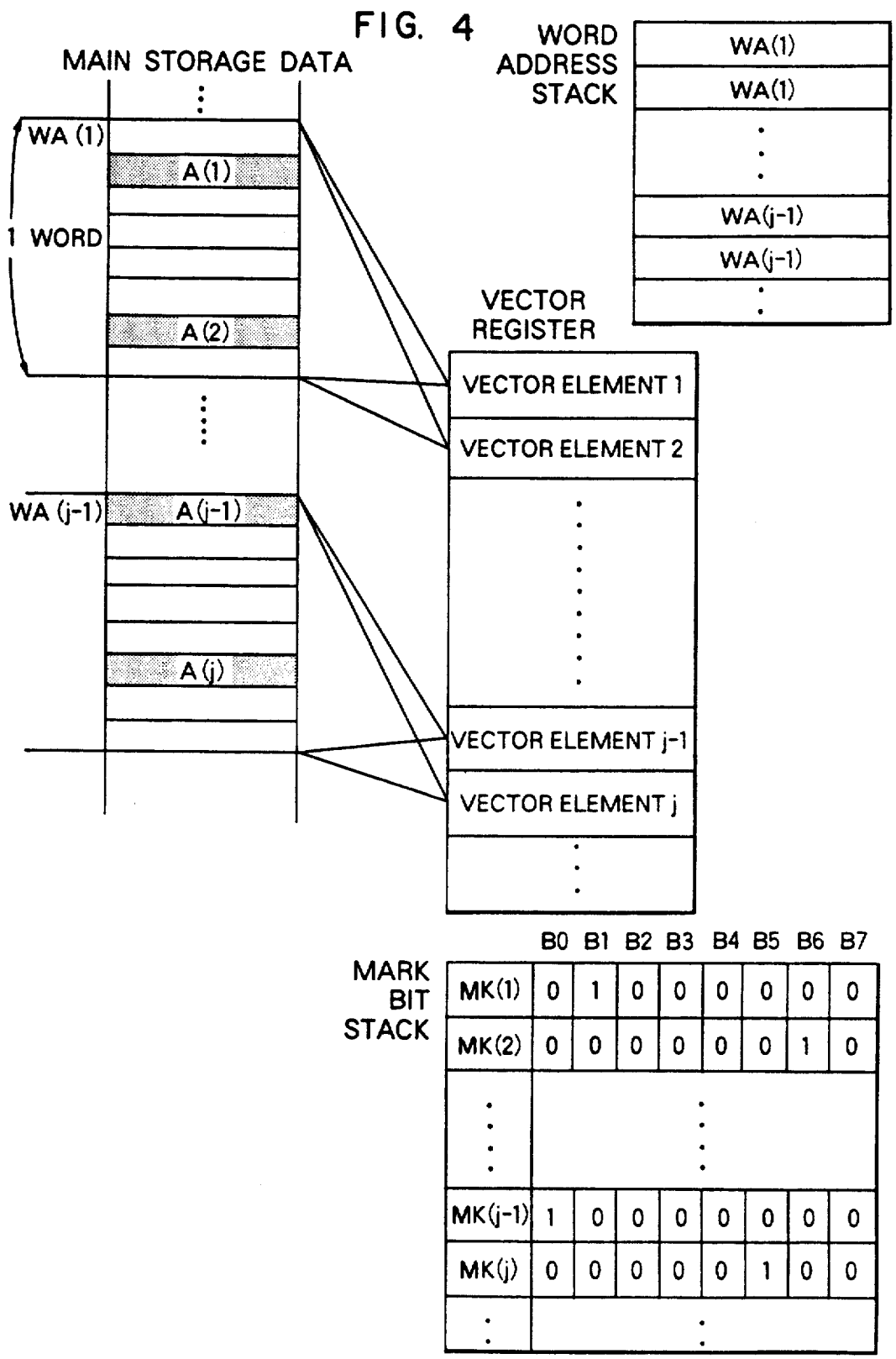

FIG. 4 shows an example where the vector element increment (ID) is 5. Where ID < 8, there may be a case where two vector elements are included in one word starting from the word address WA (j). In this case, the same word address WA (j) is continuously stacked in the word address stack 3a, as shown in FIG. 4.

Thus, the same data of the 8-byte width for the vector elements j-1 and j are written into the vector register 4. In the mark bit stack 3b, however, the difference between the byte positions of the vector elements j − 1 and j is reflected. Namely, in MK (j − 1), B0 is "1" and other bits are "0", and in MK (j), B5 is "1" and other bits are "0".

As described above, in the vector load operation, each vector element is processed in the paired fashion of the MK list stored in the mark bit stack 3b and the WA list stored in the word address stack 3a.

The vector data written in the vector register 4 are supplied to a shifter 9 through a switch matrix logic SEL 8. The shifter 9 allows shift operation by byte and a shift condition is determined by the vector element bit position which is read in accordance with the relation between the vector data and the stack, from the mark bit stack 3b corresponding to the vector element.

The vector element supplied from the shifter 9 has the decimal point position aligned to that of an operation unit 10 and then it is processed in the operation unit 10. The vector data processed by the operation unit 10 are supplied to a shifter 11. The shifter allows a shift operation by byte. It shifts the vector element shifted by the shifter 9 back to the original byte position based on the bit data supplied from the mark bit stack 3b, and the vector element is then written into the vector register 4 for storing the operation result, through the DIST 6.

Finally, the operation result is stored in the original address on the main memory 2. After the store operation, the data other than the target vector element j should not be changed. Thus, the vector data on the main memory 2 are loaded to the vector register 4 in which the operation result is stored, in accordance with the word address WA (j) of the WA list of the data stack logical unit 3 corresponding to the vector element j of the vector load operation.

Figure 5:
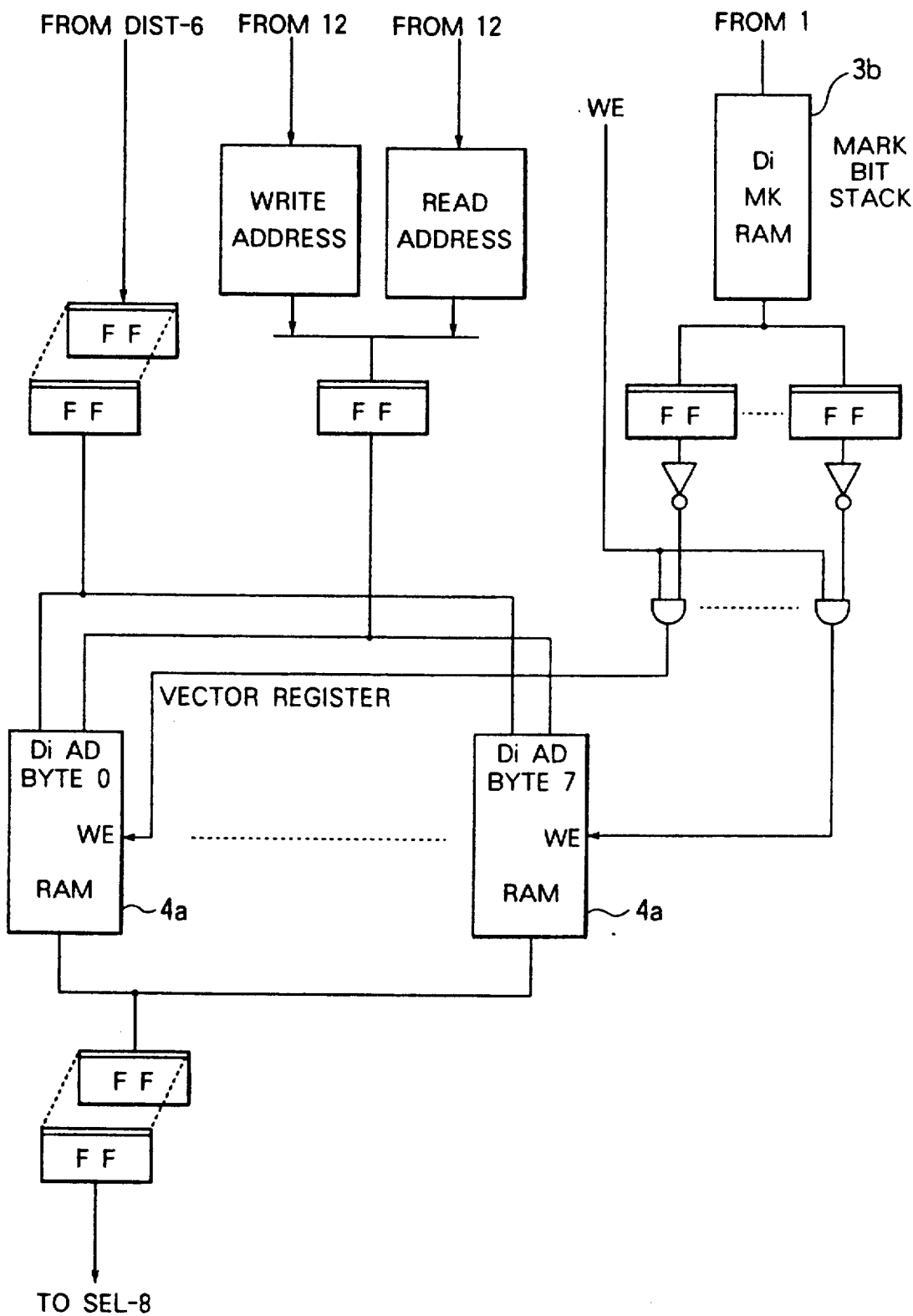
FIG. 5 illustrates a load operation in store processing.

FIG. 5 illustrates detail of the load operation in the pre-store stage.

Each of the 32 vector registers 4 shown in FIG. 1 comprises eight 1-byte RAM's which form a vector register 4a, and the WE signal is applied to enable independent writing. The WE signal is ANDed with an inverted signal of the output signal from the bits B0, B1, ... B7 of the mark bit stack 3b which is paired with the vector register 4, and the AND output signal is supplied to the vector register 4a.

In the vector load operation, the vector element j on the main memory 2 is written into the vector register 4 in which the operation result has been stored. Only those bytes which are designated by "0" mark bits B0, B1, ... B7 are updated in accordance with the MK list stored in the mark bit stack 3b. Then, the content of the vector register 4 is written into the same address as that prior to the load operation, on the main memory 2 designated by the WA list, through a store pipeline 8.

The main memory address in the above operation is generated by the main memory access control logical unit 7 by the indirect addressing in accordance with the WA list of the data stack logical unit 3.

In the case shown in FIG. 4, the WA list of the word address stack 3a is compared and the output of the mark bit stack 3b which includes the same word address continuously is ORed. It is more effective if the above operation is processed in a form of macro instruction comprising a plurality of operations.

As described above, in accordance with the present embodiment, the vector data stored by byte on the main memory may be accessed.

In the memory accessing of the vector processor, the memory access control by byte is attained without increasing the physical quantity of the hardware.

Further, the vector processor may be applied to a non-numerical calculation field such as image processing or information processing pertaining artificial intelligence by realizing the memory access control by byte.

In accordance with the present invention, the main memory accessing by byte in the vector processor is attained with less increase of hardware quantity, and the memory conflict is suppressed because the processing to the main memory is done by word.

What is claimed is:

1. A vector processor in which input/output of vector data to and from a vector register is effected by a load/store pipeline from a main memory, comprising:
said main memory having word data of a first width stored therein and read/written in one access, said first width being an integer multiple of a second width, the second width being equivalent to a length of each vector element included in the vector data;
means for generating a word address in accordance with an address of a vector element and the first width, wherein a word designated by the word address includes the vector element to be accessed;
means for generating mark bits which represent vector element positions in the word in accordance with the address of the vector element and the first width;
read means for reading word data from said main memory in one access in accordance with the word address;
a plurality of vector registers for storing the word data from each read means;
each of said vector registers having a plurality of entries, each of whose length is equal to the first width;
mark bit storage means provided one for each of said plurality of vector registers and each having the same number of entries as said vector registers;
the entries of each of said mark bit storage means storing the mark bits;
means for selecting the vector element of the second width from an entry having the first width in accordance with a mark register means which corresponds to the entry; and
send means for sending the selected vector element to an operation unit.

2. The vector processor according to claim 1, wherein said read means accesses said main memory in word units.

3. The vector processor according to claim 1, wherein said mark bit storage means includes means for storing a byte position in the word address of the vector data stored in said main memory.

4. The vector processing according to claim 1, further comprising:
word address storage means provided one for each of said plurality of vector registers and each having at least the same number of entries as said vector registers;
the entries of each of said word address storage means storing the word address representing plural-byte data stored in the entries of the corresponding vector register;
load means for loading an operation result of said operation unit into one vector register;
store means for storing data of said main memory into data portions of the entries designated by the mark, of said one vector register in accordance with the word address stored in said word address storage means; and
write means for writing the data of said one vector register into said main memory.

5. The vector processor according to claim 4, wherein said vector registers include means for being separated in byte units and means for allowing simultaneous accessing to the plural-byte data of the entries.

* * * * *